United States Patent
Khan et al.

(10) Patent No.: US 8,482,628 B1
(45) Date of Patent: Jul. 9, 2013

(54) EARLY RADIAL DISTORTION CORRECTION

(75) Inventors: Moinul H. Khan, San Diego, CA (US); Srikanth Rengarajan, Austin, TX (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/312,424

(22) Filed: Dec. 6, 2011

Related U.S. Application Data

(63) Continuation of application No. 12/166,880, filed on Jul. 2, 2008, now Pat. No. 8,085,320.

(60) Provisional application No. 60/947,542, filed on Jul. 2, 2007.

(51) Int. Cl.
*H04N 5/228* (2006.01)

(52) U.S. Cl.
USPC .......................... 348/222.1; 382/167

(58) Field of Classification Search
USPC .......................... 348/222.1; 382/167
See application file for complete search history.

(56) References Cited

U.S. PATENT DOCUMENTS

| | | | |
|---|---|---|---|
| 6,191,827 B1 * | 2/2001 | Segman et al. | 348/746 |
| 7,656,443 B2 | 2/2010 | Ikeda | |
| 8,049,795 B2 * | 11/2011 | Noh | 348/251 |
| 2003/0184546 A1 * | 10/2003 | Kitamura | 345/426 |
| 2006/0274170 A1 * | 12/2006 | Azuma | 348/246 |
| 2006/0290796 A1 | 12/2006 | Nikkanen et al. | |
| 2009/0002523 A1 | 1/2009 | Maekawa | |
| 2009/0066811 A1 | 3/2009 | Maekawa | |
| 2009/0179824 A1 | 7/2009 | Tsujimoto et al. | |

FOREIGN PATENT DOCUMENTS

JP 09098340 A 4/1997

OTHER PUBLICATIONS

"A New Analytical Radial Distortion Model for Camera Calibration"; Lili Ma, YangQuan Chen, and Kevin L. Moore; Jul. 20, 2003; 5 pages.

* cited by examiner

*Primary Examiner* — Roberto Velez
*Assistant Examiner* — Cynthia Segura

(57) ABSTRACT

An apparatus includes an input module and a color synthesis module. The input module is configured to receive mosaic image data representing an image. The mosaic image data includes radial distortion. The color synthesis module, implemented in digital electronic circuitry, includes a radial distortion correction module and a synthesis module. The radial distortion correction module is configured to receive the mosaic image data and generate correction data to correct the radial distortion in the mosaic image data. The synthesis module is configured to receive the mosaic image data and the correction data, wherein the mosaic image data includes a plurality of input pixel values and respective input pixel locations prior to being corrected, and generate demosaiced image data using the mosaic image data and the correction data.

15 Claims, 12 Drawing Sheets

*Barrel Distortion*  *Pincushion Distortion*

EARLY RADIAL DISTORTION CORRECTION

CROSS-REFERENCE TO RELATED APPLICATIONS

This application is a continuation of U.S. patent application Ser. No. 12/166,880 filed on Jul. 2, 2008, which claims the benefit of U.S. Provisional Application No. 60/947,542, filed on Jul. 2, 2007. The disclosures of the above applications are incorporated herein by reference in their entirety.

BACKGROUND

The subject matter of the present disclosure relates to correction of radial distortion in image data. The problem of radial distortion is common and well-understood in the field of image acquisition. The most common cause of radial distortion is irregular curvature of the imaging element, which is most commonly a lens. Radial distortion is manifested as either a shortening or lengthening of the radial distance in the image plane from the principal point of the image. Accordingly, the image is said to have suffered either barrel or pincushion distortion. The effects of barrel and pincushion distortion upon a rectilinear grid are shown in FIG. 1.

Radial distortion is a function of the lens material, construction, and the like, and is generally not present in expensive high-end consumer cameras because such cameras tend to use high-quality lenses such as rectilinear lenses. However, other less-specialized devices, such as mobile phones that include cameras, employ simple convex plastic lenses that induce considerable radial distortion. In addition, the drive toward smaller form factors, for example to make mobile phones thinner, can result in a very small lens where radial distortion is accentuated.

Conventional cameras correct for radial distortion in a variety of ways. High-end cameras incorporate expensive optical elements such as rectilinear lenses. Consumer cameras such as digital cameras employ a late (post-acquisition) correction of the image to account for the distortion. FIG. 2 shows a simplified block diagram of a conventional digital camera 200.

Referring to FIG. 2, camera 200 includes a lens 204, a sensor 205, a color synthesis module 206, a zoom module 208, a memory 210, a distortion correction module 212, a preview screen 214, a compression module 216, a pre-synthesis module 218, and a post-synthesis module 220. Lens 204 focuses an image upon sensor 205, which provides raw image data (also referred to as mosaic image data) to color synthesis module 206. In the mosaic image data, each pixel represents only one color. For example, according to the Bayer mosaic pattern, each pixel represents red, green, or blue.

Pre-synthesis module 218 performs functions upon the mosaic image data such as dead pixel correction, black level clamping, linearization, vignetting correction, channel gain for white balance, and the like. Color synthesis module 206 demosaics the mosaic image data, thereby producing color-synthesized image data (also referred to as demosaiced image data). In demosaiced image data, each pixel location represents all of the colors of the mosaic. For example, each pixel can comprise a RGB triad where each of the red, green, and blue channel components are available. Post-synthesis module 220 performs functions upon the demosaiced image data such as color correction, gamma correction, and the like.

Zoom module 208 scales the demosaiced image data according to a scaling factor, which can be provided according to operation of a wide-angle/telephoto control button of camera 200. Zoom module 208 stores the scaled demosaiced image data in memory 210.

Distortion correction module 212 retrieves the image data from memory 210, corrects the image data for the radial distortion introduced by lens 204, and stores the corrected image data in memory 210. The corrected image data can then be provided to preview screen 214, compressed by compression module 216 according to a compression standard such as the Joint Photographic Experts Group (JPEG) standard, and the like. The image data may also be provided for video compression using MPEG/H.26x compression standards, or may also be provided to an analysis module for evaluation of scene structure/detail to be used for face tracking, smile detection, or other applications of machine vision.

Conventional distortion correction modules 212 typically employ a geometric transformation of a two-dimensional object in a three-dimensional space. The transformation can be approximated to a polynomial relationship between the distorted and undistorted image points. Most of these polynomials assume the distortion function to be a pure, odd function of the radius from the principal point of the image. In order to account for other anomalies in lens construction, distortion correction module 212 may use a look-up table to derive any non-uniform stretching required on the image. This correction operation is computationally intensive and is therefore performed in software or by dedicated graphics processing engines.

These conventional solutions pose a number of practical problems. During the correction some pixels are mapped outside the viewing pane, and are therefore omitted, leaving unmapped pixel places (also referred to as holes) in the viewing pane. To alleviate this problem, a smoothing algorithm is usually executed on the transformed image, thereby increasing the number of operations, which in turn increases the band-width to memory 210. These practical challenges may prevent correcting radial distortion at run time or during the preview of the image.

SUMMARY

In general, in one aspect, an embodiment features an apparatus comprising an input module to receive image data representing an image, wherein the image data includes radial distortion; and a zoom module to scale the image based on the image data and a scaling factor, wherein the zoom module comprises a radial distortion correction module to correct the radial distortion in the image data while the zoom module scales the image.

Embodiments of the apparatus can include one or more of the following features. In some embodiments, the image data represents a plurality of pixels, and wherein each of the pixels has a respective input pixel location; wherein the zoom module further comprises a location module to provide a respective output pixel location for each of the pixels based on the scaling factor and the input pixel locations; wherein the radial distortion correction module comprises a translation module to provide a respective output pixel location correction for each of the pixels based on the respective output pixel location; and wherein the zoom module further comprises a scaling module to scale the image according to the output pixel locations and the output pixel location corrections. Some embodiments comprise an integrated circuit comprising the apparatus. Some embodiments comprise a camera comprising the integrated circuit.

In general, in one aspect, an embodiment features an apparatus comprising: input means for receiving image data representing an image, wherein the image data includes radial distortion; and zoom means for scaling the image based on the image data and a scaling factor, wherein the zoom means comprises radial distortion correction means for correcting the radial distortion in the image data while the zoom means scales the image.

Embodiments of the apparatus can include one or more of the following features. In some embodiments, the image data represents a plurality of pixels, and wherein each of the pixels has a respective input pixel location; wherein the zoom means further comprises location means for providing a respective output pixel location for each of the pixels based on the scaling factor and the input pixel locations; wherein the radial distortion correction means comprises translation means for providing a respective output pixel location correction for each of the pixels based on the respective output pixel location; and wherein the zoom means further comprises scaling means for scaling the image according to the output pixel locations and the output pixel location corrections. Some embodiments comprise an integrated circuit comprising the apparatus. Some embodiments comprise a camera comprising the integrated circuit.

In general, in one aspect, an embodiment features a method comprising receiving image data representing an image, wherein the image data includes radial distortion; and scaling the image based on the image data and a scaling factor, wherein the scaling comprises correcting the radial distortion in the image data.

Embodiments of the method can include one or more of the following features. In some embodiments, the image data represents a plurality of pixels, and wherein each of the pixels has a respective input pixel location; wherein the scaling further comprises providing a respective output pixel location for each of the pixels based on the scaling factor and the input pixel locations; wherein correcting the radial distortion comprises providing a respective output pixel location correction for each of the pixels based on the respective output pixel location; and wherein the scaling further comprises scaling the image according to the output pixel locations and the output pixel location corrections.

In general, in one aspect, an embodiment features a computer program executable on a processor, comprising: instructions for receiving image data representing an image, wherein the image data includes radial distortion; and instructions for scaling the image based on the image data and a scaling factor, wherein the instructions for scaling comprise instructions for correcting the radial distortion in the image data.

Embodiments of the computer program can include one or more of the following features. In some embodiments, the image data represents a plurality of pixels, and wherein each of the pixels has a respective input pixel location; wherein the instructions for scaling further comprise instructions for providing a respective output pixel location for each of the pixels based on the scaling factor and the input pixel locations; wherein the instructions for correcting the radial distortion comprise instructions for providing a respective output pixel location correction for each of the pixels based on the respective output pixel location; and wherein the instructions for scaling further comprise instructions for scaling the image according to the output pixel locations and the output pixel location corrections.

In general, in one aspect, an embodiment features an apparatus comprising: an input module to receive mosaic image data representing an image, wherein the image data includes radial distortion; and a color synthesis module to color-synthesize the image based on the mosaic image data, wherein the color synthesis module comprises a radial distortion correction module to correct the radial distortion in the image data while the color synthesis module color-synthesizes the image.

Embodiments of the apparatus can include one or more of the following features. In some embodiments, the image data represents a plurality of pixels, and wherein each of the pixels has a respective input pixel value and a respective input pixel location; wherein the radial distortion correction module comprises a translation module to provide an output pixel location correction for each of the pixels based on the respective input pixel location; and wherein the color synthesis module further comprises a synthesis module to generate output pixel values based on the input pixel values, the input pixel locations, and the output pixel location corrections. In some embodiments, the input pixel values represent mosaic data and the output pixel values represent demosaiced data. In some embodiments, the synthesis module comprises a mosaic module to generate intermediate pixel values based on the input pixel values, the input pixel locations, and the output pixel location corrections, wherein the intermediate pixel values represent mosaic data; and a demosaic module to generate the output pixel values based on the intermediate pixel values. Some embodiments comprise an integrated circuit comprising the apparatus. Some embodiments comprise a camera comprising the integrated circuit.

In general, in one aspect, an embodiment features an apparatus comprising: input means for receiving mosaic image data representing an image, wherein the image data includes radial distortion; and color synthesis means for color-synthesizing the image based on the mosaic image data, wherein the color synthesis module comprises radial distortion correction means for correcting the radial distortion in the image data while the color synthesis means color-synthesizes the image.

Embodiments of the apparatus can include one or more of the following features. In some embodiments, the image data represents a plurality of pixels, and wherein each of the pixels has a respective input pixel value and a respective input pixel location; wherein the radial distortion correction means comprises translation means for providing an output pixel location correction for each of the pixels based on the respective input pixel location; and wherein the color synthesis means further comprises synthesis means for generating output pixel values based on the input pixel values, the input pixel locations, and the output pixel location corrections. In some embodiments, the input pixel values represent mosaic data and the output pixel values represent demosaiced data. In some embodiments, the synthesis means comprises: mosaic means for generating intermediate pixel values based on the input pixel values, the input pixel locations, and the output pixel location corrections, wherein the intermediate pixel values represent mosaic data; and demosaic means for generating the output pixel values based on the intermediate pixel values. Some embodiments comprise an integrated circuit comprising the apparatus. Some embodiments comprise a camera comprising the integrated circuit.

In general, in one aspect, an embodiment features a method comprising: receiving mosaic image data representing an image, wherein the image data includes radial distortion; and color-synthesizing the image based on the mosaic image data, wherein the color-synthesizing comprises correcting the radial distortion in the image data.

Embodiments of the method can include one or more of the following features. In some embodiments, the image data represents a plurality of pixels, and wherein each of the pixels has a respective input pixel value and a respective input pixel location; wherein correcting the radial distortion comprises providing an output pixel location correction for each of the pixels based on the respective input pixel location; and wherein the color-synthesizing further comprises generating output pixel values based on the input pixel values, the input pixel locations, and the output pixel location corrections. In some embodiments, the input pixel values represent mosaic data and the output pixel values represent demosaiced data. In some embodiments, color-synthesizing further comprises generating intermediate pixel values based on the input pixel values, the input pixel locations, and the output pixel location corrections, wherein the intermediate pixel values represent mosaic data; and generating the output pixel values based on the intermediate pixel values.

In general, in one aspect, an embodiment features a computer program executable on a processor, comprising: instructions for receiving mosaic image data representing an image, wherein the image data includes radial distortion; and instructions for color-synthesizing the image based on the mosaic image data, wherein the instructions for color-synthesizing comprise instructions for correcting the radial distortion in the image data.

Embodiments of the computer program can include one or more of the following features. the image data represents a plurality of pixels, and wherein each of the pixels has a respective input pixel value and a respective input pixel location; wherein the instructions for correcting the radial distortion comprise instructions for providing an output pixel location correction for each of the pixels based on the respective input pixel location; and wherein the instructions for color-synthesizing further comprise instructions for generating output pixel values based on the input pixel values, the input pixel locations, and the output pixel location corrections. In some embodiments, the input pixel values represent mosaic data and the output pixel values represent demosaiced data. In some embodiments, the instructions for color-synthesizing further comprise instructions for generating intermediate pixel values based on the input pixel values, the input pixel locations, and the output pixel location corrections, wherein the intermediate pixel values represent mosaic data; and instructions for generating the output pixel values based on the intermediate pixel values.

The details of one or more implementations are set forth in the accompanying drawings and the description below. Other features will be apparent from the description and drawings, and from the claims.

Figure 1:
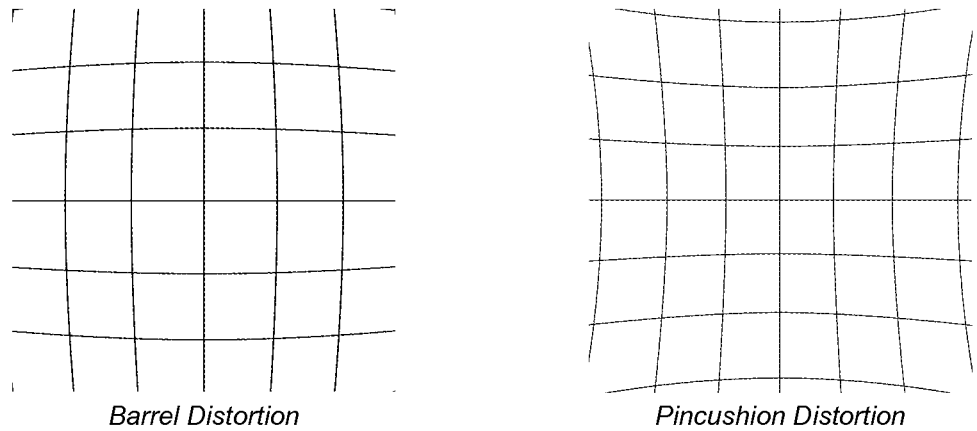
FIG. 1 shows the effects of barrel and pincushion distortion upon a rectilinear grid.

The leading digit(s) of each reference numeral used in this specification indicates the number of the drawing in which the reference numeral first appears.

DETAILED DESCRIPTION

Embodiments of the present disclosure provide early radial distortion correction, that is, radial distortion correction during zooming and color synthesis operations rather than afterwards. These functions can be implemented in hardware, thereby increasing performance compared to late, software-based correction.

Before describing various embodiments, a model of radial distortion is first described. Let an object in the world space be represented by $[X_W, Y_W, Z_W, 1]^T$. Using ideal optics, let the image captured in the sensor be represented by $(u, v)$. Then a perspective projection matrix can directly link a point in the 3-D world reference frame to its projection (undistorted) on the image plane by:

$$\lambda \begin{bmatrix} u \\ v \\ 1 \end{bmatrix} = A[R \mid t] \begin{bmatrix} X_W \\ Y_W \\ Z_W \\ 1 \end{bmatrix} \qquad (1)$$

with $(R, t)$ being the rotation matrix and the translation vector, and where A is a function of the intrinsic parameters ($\alpha, \beta, \gamma, u_0, v_0$) of the camera where $\alpha, \beta$ are two scalars on the camera's axes, $\gamma$ is the skewness of the two axes, and $(u_0, v_0)$ are the coordinates of the principal point.

Due to the optical distortion, the image presented to sensor 205 is $[X_C, Y_C, Z_C, 1]^T$ and the radially-distorted image is $(u_d, v_d)$ giving:

$$\begin{bmatrix} u_d \\ v_d \\ 1 \end{bmatrix} = A \begin{bmatrix} X_c \\ Y_c \\ Z_c \\ 1 \end{bmatrix} \qquad (2)$$

where $$A = \begin{bmatrix} \alpha & \gamma & u_0 \\ 0 & \beta & v_0 \\ 0 & 0 & 1 \end{bmatrix} \qquad (3)$$

and $$\begin{bmatrix} Xc \\ Yc \\ Zc \end{bmatrix} = [R \mid t] \begin{bmatrix} Xw \\ Yw \\ Zw \end{bmatrix} \qquad (4)$$

Here $\alpha, \beta, \gamma$ are a function of the pixel co-ordinates and are linked to the image points as shown in Table 1 below.

TABLE 1

| Variable | Description |
|---|---|
| $(u_d, v_d)$ | Distorted image point in pixel |
| $(u, v)$ | Distortion-free image point in pixel |
| $(x_d, y_d)$ | $[x_d, y_d, 1]^T = A^{-1} [u_d, v_d, 1]^T$ |
| $(x, y)$ | $[x, y, 1]^T = A^{-1} [u, v, 1]^T$ |
| $r_d$ | $r_d^2 = x_d^2 + y_d^2$ |
| $r$ | $r^2 = x^2 + y^2$ |
| $k$ | Radial distortion coefficients |

The goal of distortion correction is to create (u, v) from ($u_d$, $v_d$). This analysis can be simplified based on the radial symmetry of the optical system, as shown in equation (5).

$$r_d = rf(r) = r(1 + k_1 R + k_2 r^2 + \ldots) \quad (5)$$

where r is the location of the pixels (in radial co-ordinates) in the undistorted image, $r_d$ is the location of the pixels in the distorted image, and k represents the coefficient of distortion. Equation (5) can be simplified as shown in equation (6)

$$r_d = rf(r) = r(1 + k_1 R + k_2 r^2) \quad (6)$$

It can be shown that $$r = r_d(1 - k_1 r_d^2 - k_2 r_d^4) \quad (7)$$

Generally pixels in the camera are processed in a raster fashion. Thus, in the rectangular co-ordinate system a similar correction can be made, as shown in equations (8) and (9).

$$x = x_d K_x = x_d(1 - k_1 r_d^2 - k_2 r_d^4) \quad (8)$$

$$y = y_d K_y = y_d(1 - k_1 r_d^2 - k_2 r_d^4) \quad (9)$$

Thus, each observed pixel at ($x_d$, $y_d$) should be written to (x, y). However, (x, y) may not be an integer pixel, may be on a different line, or the like. This poses two problems: lack of coverage and additional computation.

Conversely, each pixel in the corrected image (x, y) can be generated from ($x_d$, $y_d$) where $$x_d = x/K_x \quad (10)$$

and $$y_d = y/K_y \quad (11)$$

Similarly, if the location ($x_d$, $y_d$) is not an integer location, the pixel value for this location can be generated from values of neighboring pixels. The pixel at ($x_d$, $y_d$) can be created from R($x_d$, $y_d$) where R is the region of support. For a filtering kernel the region of support can be 5×5, 3×3 or n×n, depending on the complexity and quality tradeoff.

Figure 2:
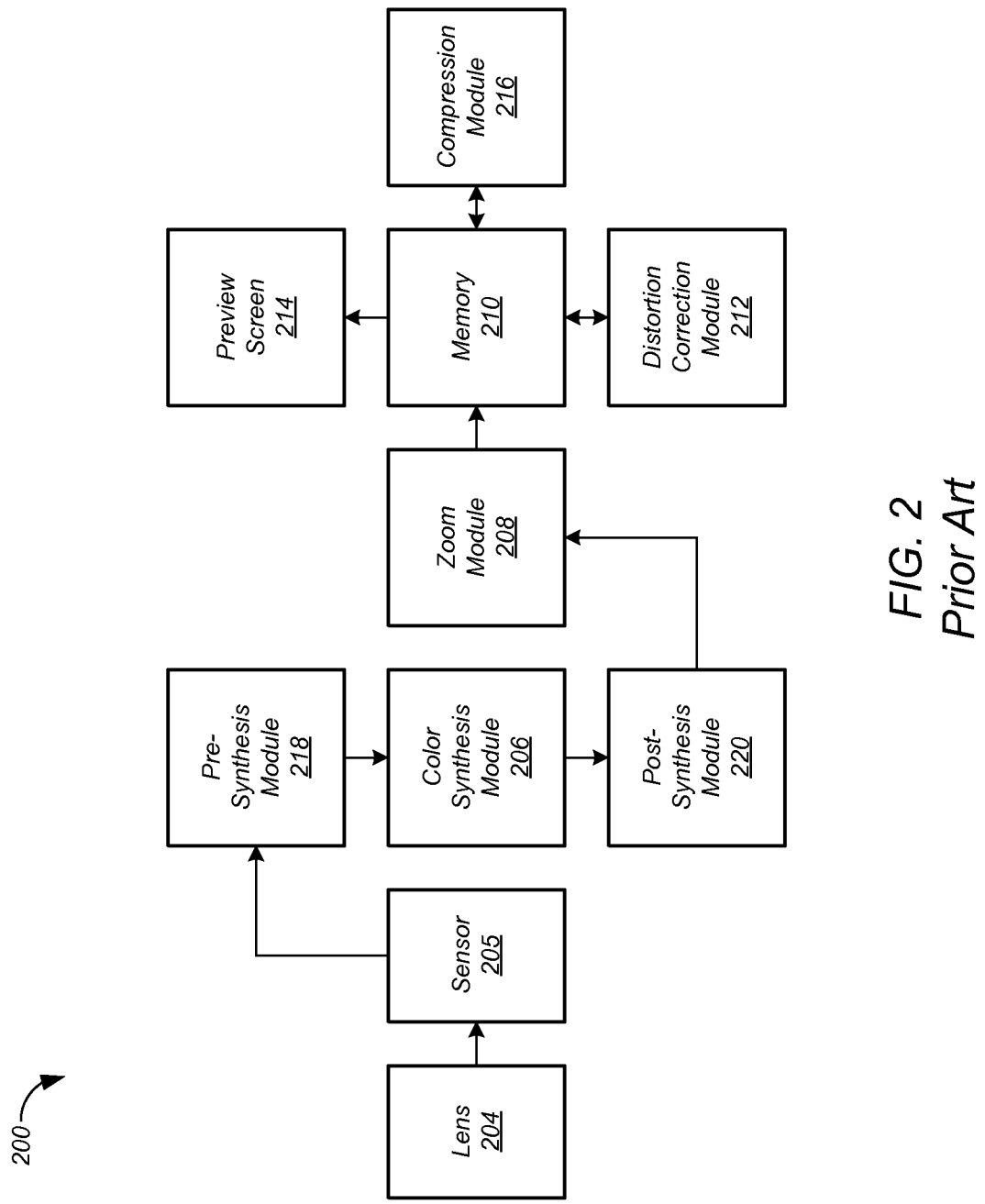
FIG. 2 shows a simplified block diagram of a conventional digital camera.

Referring again to FIG. 2, in conventional cameras radial distortion is corrected late, that is, after the image has been color synthesized, scaled, and stored in memory 210. In contrast, in various embodiments, radial distortion is corrected early, that is during the zooming and/or color synthesis operations rather than after such operations.

Figure 3:
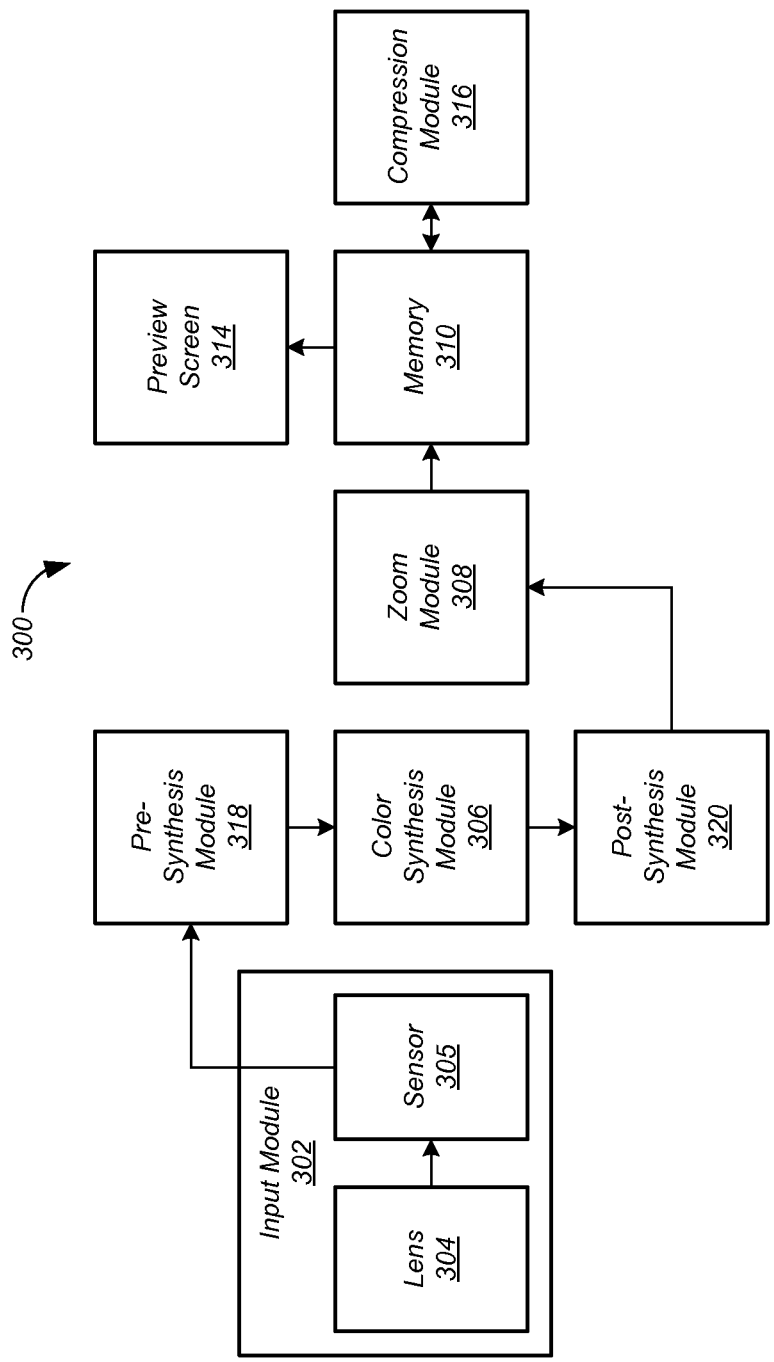
FIG. 3 shows a simplified block diagram of a digital camera according to various embodiments.

FIG. 3 shows a simplified block diagram of a digital camera 300 according to various embodiments. Although in the described embodiments, the elements of camera 300 are presented in one arrangement, other arrangements are within the scope of the present invention. For example, various elements of camera 300 can be implemented in hardware, software, or combinations thereof.

Referring to FIG. 3, camera 300 includes an input module 302, a color synthesis module 306, a zoom module 308, a memory 310, a preview screen 314, and a compression module 316, a pre-synthesis module 318, and a post-synthesis module 320. Input module 302 can include a lens 304 and a sensor 305. However, unlike conventional camera 200 of FIG. 2, camera 300 of FIG. 3 does not include a separate distortion correction module. Instead, the distortion correction function is combined with the color synthesis function or the zooming function, as described in detail below.

First, radial distortion correction during zooming (scaling) is described. Most digital imaging devices such as digital still cameras include an on-board hardware scaling module such as zoom module 308 as an indispensable part of the image signal processor. The scaling module is generally used for performing preview functions as well as for digital zooming. By implementing the scaling module as described below, radial distortion correction can be achieved with little or no overhead. Software involvement can be limited to loading a coefficient look-up table at power-up. The coefficients can be based on the intrinsic parameters of the optical element in the device. Various embodiments are described based on a bi-cubic image scalar filter. However, other sorts of filtering approaches are other arrangements are within the scope of the present invention.

Figure 4:
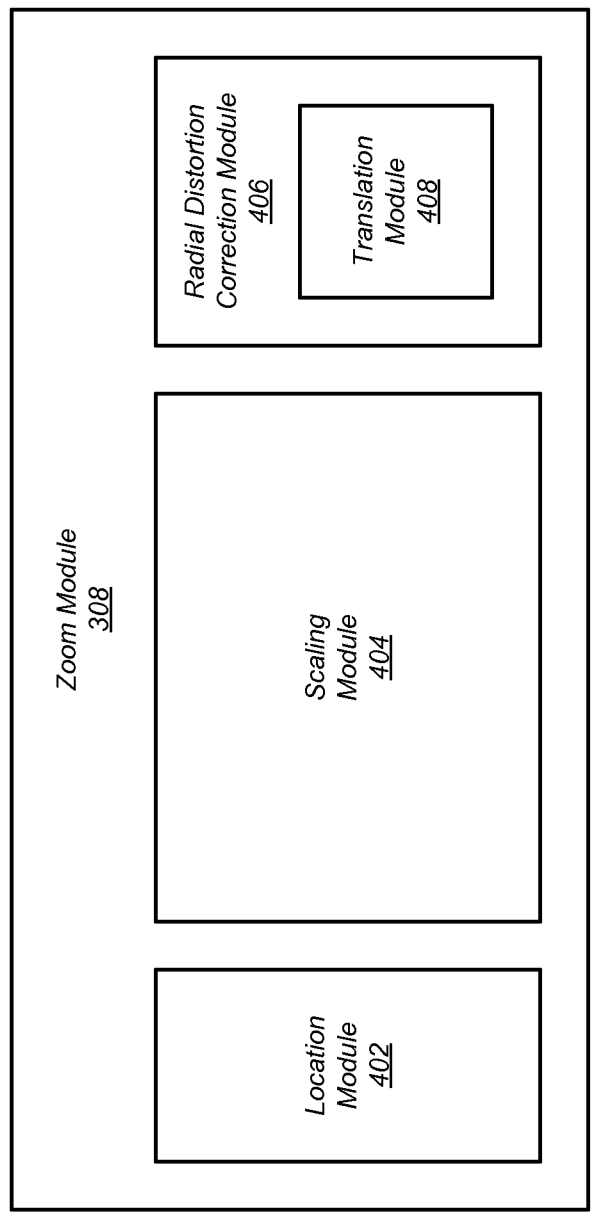
FIG. 4 shows detail of zoom module of the camera of FIG. 3 according to one embodiment.

FIG. 4 shows detail of zoom module 308 of camera 300 of FIG. 3 according to one embodiment. Although in the described embodiments, the elements of zoom module 308 are presented in one arrangement, other arrangements are within the scope of the present invention. For example, various elements of zoom module 308 can be implemented in hardware, software, or combinations thereof.

Referring to FIG. 4, zoom module 308 includes a location module 402, a scaling module 404, and a radial distortion correction module 406. Radial distortion correction module 406 includes a translation module 408. Zoom module 308 can be fabricated as one or more integrated circuits, which can include one or more other elements of camera 300.

Figure 5:
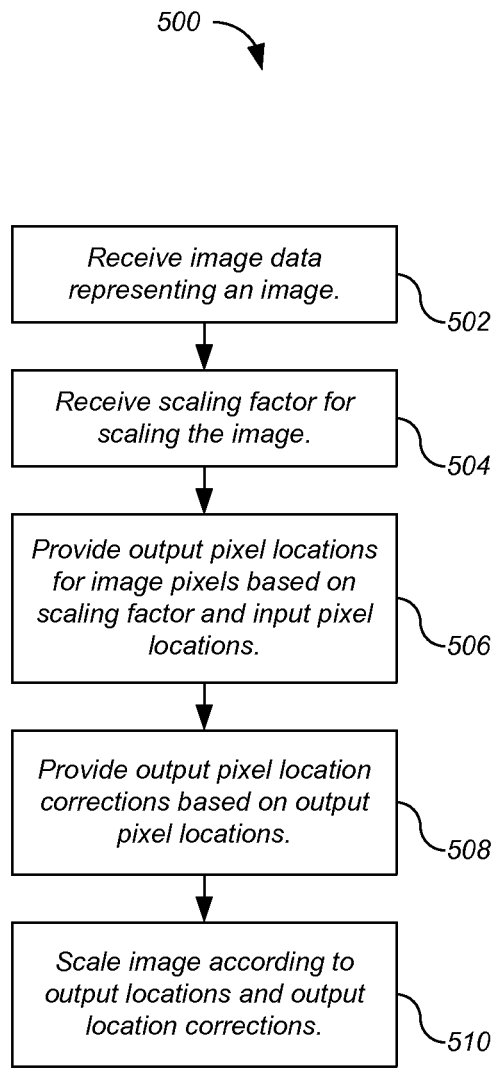
FIG. 5 shows a process for the zoom module of FIG. 4 according to one embodiment.

FIG. 5 shows a process 500 for zoom module 308 of FIG. 4 according to one embodiment. Although in the described embodiments, the elements of process 500 are presented in one arrangement, other arrangements are within the scope of the present invention. For example, in various embodiments, some or all of the steps of process 500 can be executed in a different order, concurrently, and the like.

Referring to FIG. 5, input module 302 (FIG. 3) receives image data representing an image (step 502). The image data includes radial distortion, which can be caused by lens 304 of camera 300 (FIG. 3). However, various embodiments are not limited by the cause of the radial distortion. The image data can be color-synthesized image data provided by color synthesis module 306. The data can be in any color space. For example, the image data can be in the RGB color space, the YCbCr color space, and the like.

Scaling module 404 receives a scaling factor for scaling the image (step 504). The scaling factor can be provided according to operation of a wide-angle/telephoto control button of camera 300 (FIG. 3).

The image data represents a plurality of pixels each having a respective input pixel location. Location module 402 provides a respective output pixel location for each of the pixels based on the scaling factor and the input pixel locations (step 506). These output pixel locations include radial distortion.

Translation module 408 provides a respective output pixel location correction for each of the pixels based on the respective output pixel location provided by location module 402 (step 508). The output pixel location corrections correct the output pixel locations for the radial distortion.

Scaling module 404 scales the image according to the output pixel locations and the output pixel location corrections (step 510). That is, scaling module 404 determines the pixel values for each corrected output pixel location.

The standard bicubic scaling operation involves the multiplication of a rectangular grid of pixels with a set of coefficients that are a function of the location of the output pixels in the input grid. The multiplier outputs are summed to generate the scaled output pixel. A given grid of input pixels may yield more than one output pixel (known as upscaling). The effect is to alter the contribution of the grid pixels to the output in a predetermined fashion.

In one implementation, the output pixel location is allowed to map onto a fixed subset of locations on the grid, and there are a total of 256 possible positions that output pixel can occupy. Because 16 input pixels are involved in the process, 16 coefficients (multipliers) are needed for each of the 256 points. However, due to the bilateral symmetry of the bicubic process in each direction, a total of only 32 coefficients are necessary. Seen within the context of a scaling grid, the effect of radial distortion is to move the generated output pixel to a different location within the grid, as long as the magnitude of the distortion is not large enough to place the generated output pixel location outside the current generation window, which would require a new grid.

Figure 6:
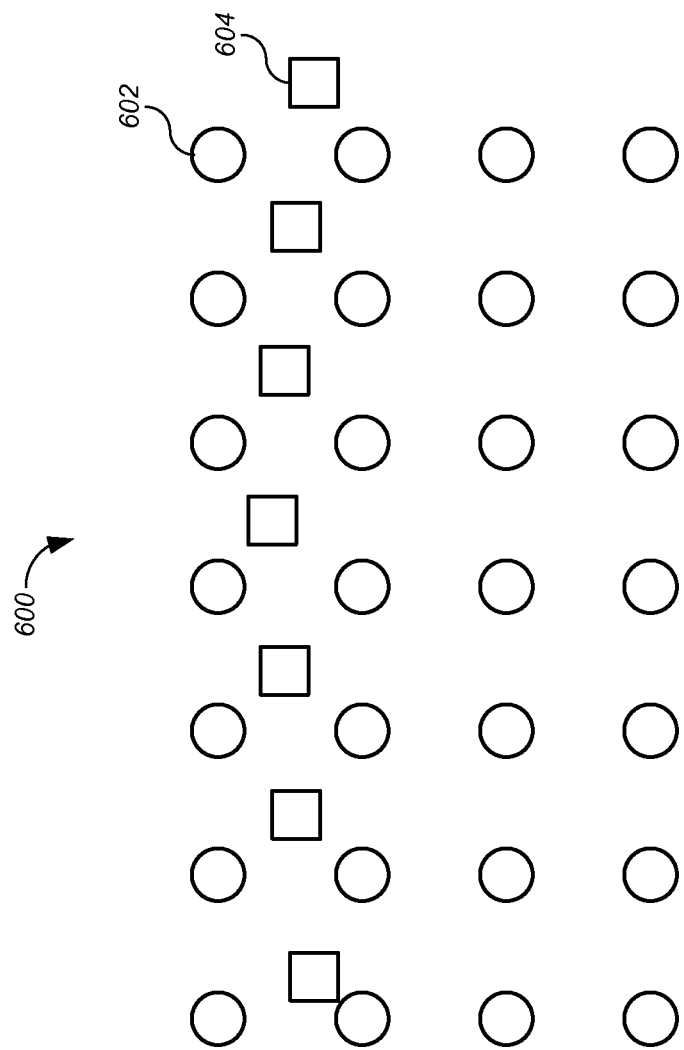
FIG. 6 shows the relationship between the locations of input pixels and distortion-corrected, scaled output pixels for an example image.

FIG. 6 shows the relationship between the locations of input pixels 602 and distortion-corrected, scaled output pixels 604 for an example image 600. Referring to FIG. 6, input pixels 602 are shown as circles, while output pixels 604 are shown as squares. Referring to FIG. 6, the distortion correction remaps the location of output pixel 604 within the grid formed by the surrounding input pixels 602. Here, the original distortion is assumed to be of the barrel variety, thereby necessitating a correction that is convex with respect to the image center.

For scaling at an arbitrary point (a, b), a pixel is generated by weighted average of the surrounding pixels belonging to the region of support.

$$O(a, b) = \sum_{Re\,gionofSupport} Coeff\_x[i]Coeff\_y[j]I(i, j) \quad (12)$$

FIG. 6 assumes that the region of support is restricted to the surrounding four pixels. If a bi-cubic kernel being used in the interpolation, $$Coeff\_x[i]=1-2|\lfloor a \rfloor+(m-1)-a|^2+|\lfloor a \rfloor+(m-1)-a|^3 \text{ if } |\lfloor a \rfloor+(m-1)-a|<1 \quad (13)$$

$$Coeff\_x[i]=4-8|\lfloor a \rfloor+(m-1)-a|+5|\lfloor a \rfloor+(m-1)-a|^2-|\lfloor a \rfloor+(m-1)-a|^3 \text{ if } |\lfloor a \rfloor+(m-1)-a|\geq 1 \quad (14)$$

with the same holding good for Coeff_y[j]. By substituting a with $$x'_d=x/sK_x \quad (15)$$

and b with $$y'_d=y/sK_y \quad (16)$$

a scaling kernel can be used for creating data points for the radial distortion correction as well as the scaling. Here s is the scaling ratio in both x and y directions. Within this constraint, translation module 408 generates the output pixel corresponding to the distortion-corrected coordinates as part of the scaling process.

Figure 7:
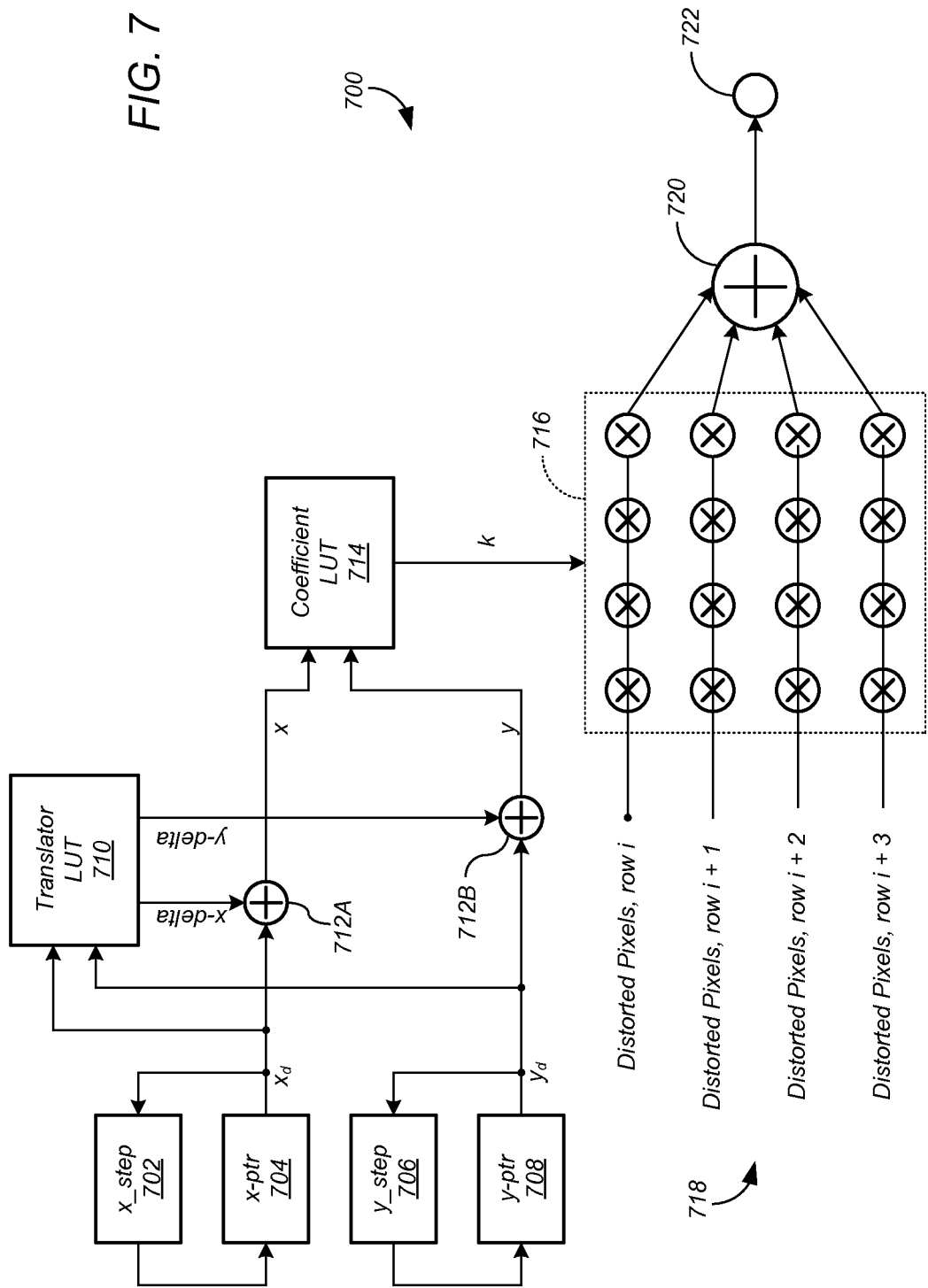
FIG. 7 illustrates the operation of the zoom module of FIG. 3 according to one embodiment.

FIG. 7 illustrates the operation of zoom module 308 of FIG. 3 according to one embodiment. Referring to FIG. 7, uncorrected output pixel locations ($x_d$, $y_d$) are provided by an x_step module 702, a x-ptr module 704, a y_step module 706, and a y-ptr module 708 according to the scaling factor. A translator look-up table (LUT) 710 provides output pixel location corrections (x-delta, y-delta) in response to the uncorrected output pixel locations ($x_d$, $y_d$). Output pixel location corrections (x-delta, y-delta) are signed integers of appropriate precision. For low levels of distortion, multiple grids may be grouped together to reduce the size of LUT 710.

Adders 712A,B add output pixel location corrections (x-delta, y-delta) to the uncorrected output pixel locations ($x_d$, $y_d$) to produce the distortion-corrected scaled output pixel locations (x, y) according to equations (17) and (18).

$$x=x_d+x\text{-delta} \quad (17)$$

$$y=y_d+y\text{-delta} \quad (18)$$

Distortion-corrected scaled output pixel locations (x, y) are used to index coefficient LUT 714, which provides scaling coefficients k. Multipliers 716 multiply the values of the pixels 718 in the region of support, which in the example of FIG. 7 is a 4×4 region of 16 pixels. Adder 720 adds the products to obtain the pixel value of output pixel 722.

Now, radial distortion correction during color synthesis is described. Like the bi-cubic scaling operation described above, a color image sampled according to the Bayer mosaic can also be resampled where a pixel in a R, G or B channel can be generated by interpolating from the surrounding R, G, B pixels, respectively. However, while various embodiments are describe with reference to the Bayer mosaic, other embodiments can employ other mosaics such as the panchromatic (RGBP) mosaic and the like.

Figure 8:
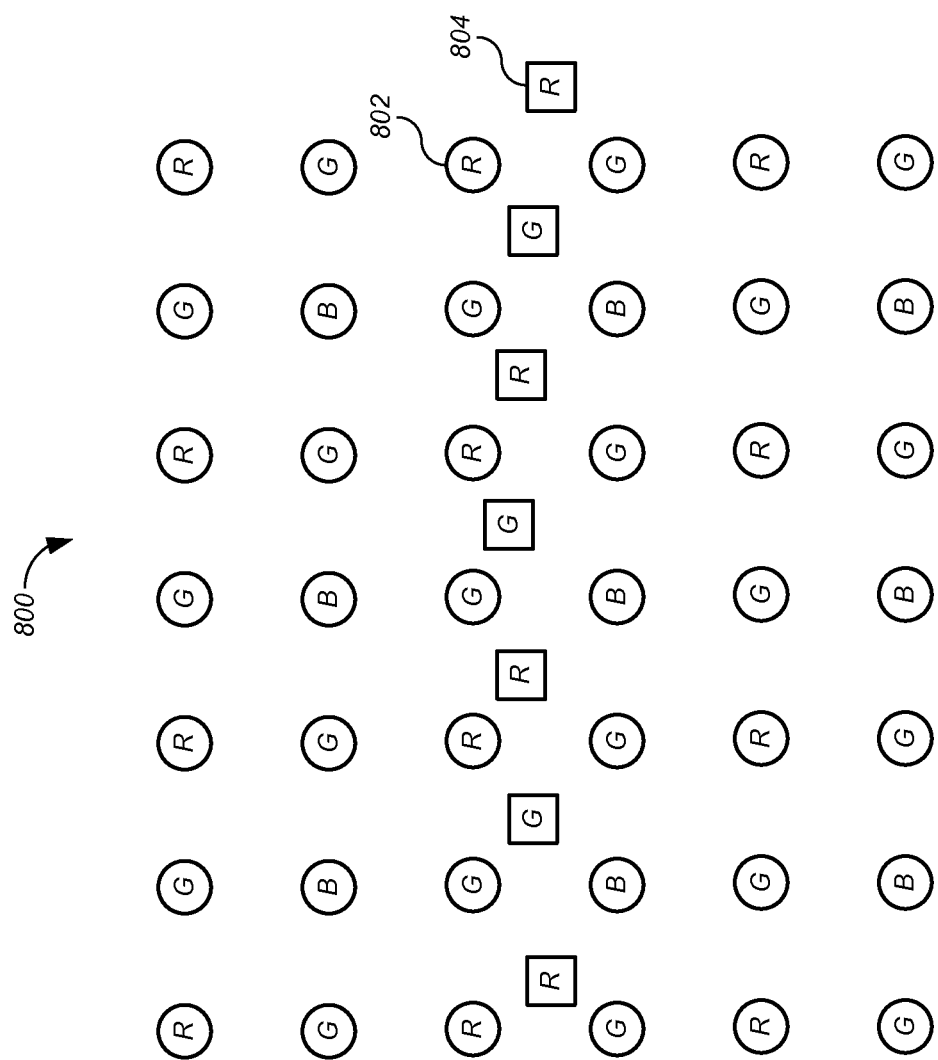
FIG. 8 shows the relationship between the locations of input pixels for a Bayer mosaic and distortion-corrected, color-synthesized output pixels for an example image.

FIG. 8 shows the relationship between the locations of input pixels 802 for a Bayer mosaic and distortion-corrected, color-synthesized output pixels 804 for an example image 800. Referring to FIG. 8, input pixels 802 are shown as circles, while output pixels 804 are shown as squares. Referring to FIG. 8, the distortion correction remaps the location of each output pixel 804 within the grid formed by the surrounding input pixels 802. Here, the original distortion is assumed to be of the barrel variety, thereby necessitating a correction that is convex with respect to the image center. For scaling at an arbitrary point (a, b), a pixel is generated by weighted average of the surrounding pixels belonging to the region of support, for example as described above.

The equations described above for radial distortion correction during zooming above can be re-derived with the region of support changed to account for the Bayer sampling. As shown in FIG. 8, the Bayer mosaic has two distinct arrangements of pixels (RGRG and GBGB) alternating on even and odd rows. Some algorithms provide for different approaches for synthesis of the missing pixel color components at each sensed pixel location. However, the basic principle remains the same in that the position of the color-synthesized pixel is remapped to account for the radial distortion.

Two approaches to radial distortion correction during color synthesis are described. In the first approach, the radial distortion is corrected before demosaicing. That is, Bayer-patterned pixels are generated along the lines of the distortion-corrected path, and then the Bayer-patterned pixels are demosaiced. For example, referring again to FIG. 8, red pixels in the distortion-corrected positions of output pixels 804 are generated from the neighboring red input pixels 802.

Figure 9:
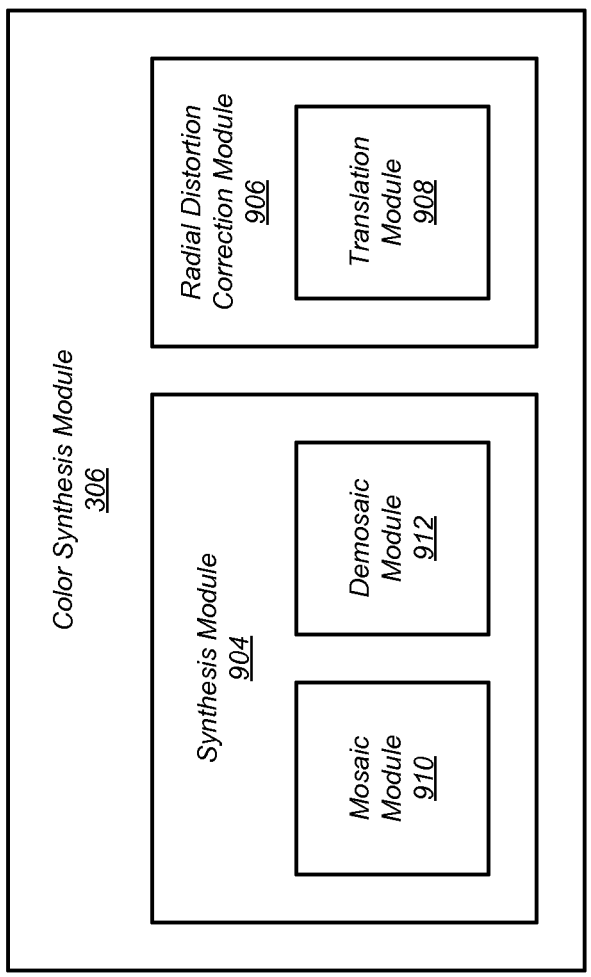
FIG. 9 shows detail of the color synthesis module of the camera of FIG. 3 according to an embodiment for radial distortion correction before demosaicing.

FIG. 9 shows detail of color synthesis module 306 of camera 300 of FIG. 3 according to an embodiment for radial distortion correction before demosaicing. Although in the described embodiments, the elements of color synthesis module 306 are presented in one arrangement, other arrangements are within the scope of the present invention. For example, various elements of color synthesis module 306 can be implemented in hardware, software, or combinations thereof.

Referring to FIG. 9, color synthesis module 306 includes a synthesis module 904 and a radial distortion correction module 906. Radial distortion correction module 906 includes a translation module 908. Synthesis module 904 includes a mosaic module 910 and a demosaic module 912. Color synthesis module 306 can be fabricated as one or more integrated circuits, which can include one or more other elements of camera 300.

Figure 10:
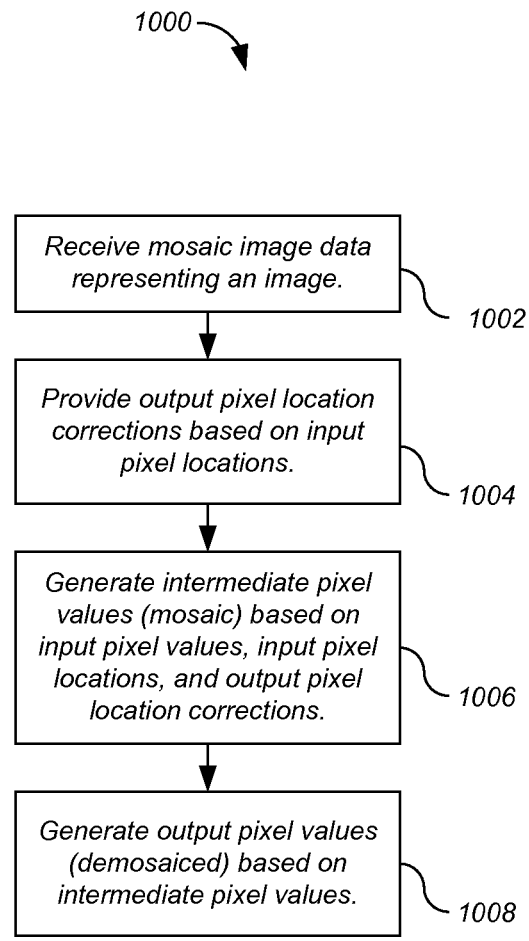
FIG. 10 shows a process for the color synthesis module of FIG. 9 according to one embodiment.

FIG. 10 shows a process 1000 for color synthesis module 306 of FIG. 9 according to one embodiment. Although in the described embodiments, the elements of process 1000 are presented in one arrangement, other arrangements are within the scope of the present invention. For example, in various embodiments, some or all of the steps of process 1000 can be executed in a different order, concurrently, and the like.

Referring to FIG. 10, input module 302 (FIG. 3) receives mosaic image data representing an image (step 1002). The image data includes radial distortion, which can be caused by lens 304 of camera 300 (FIG. 3). However, various embodiments are not limited by the cause of the radial distortion.

The image data represents a plurality of pixels each having a respective input pixel location. Translation module 908 provides a respective output pixel location correction for each of the pixels based on the respective input pixel location (step 1006). The output pixel location corrections correct the output pixel locations for the radial distortion.

Synthesis module 904 generates output pixel values based on the input pixel values, the input pixel locations, and the output pixel location corrections, where the input pixel values represent mosaic data and the output pixel values represent demosaiced data. In particular, mosaic module 910 generates intermediate pixel values based on the input pixel values, the input pixel locations, and the output pixel location corrections, where the intermediate pixel values represent mosaic data (step 1006), and demosaic module 912 generates the output pixel values based on the intermediate pixel values (step 1008). That is, mosaic module 910 provides radial distortion correction in the input mosaic pattern, and demosaic module 912 demosaics the corrected data.

Figure 11:
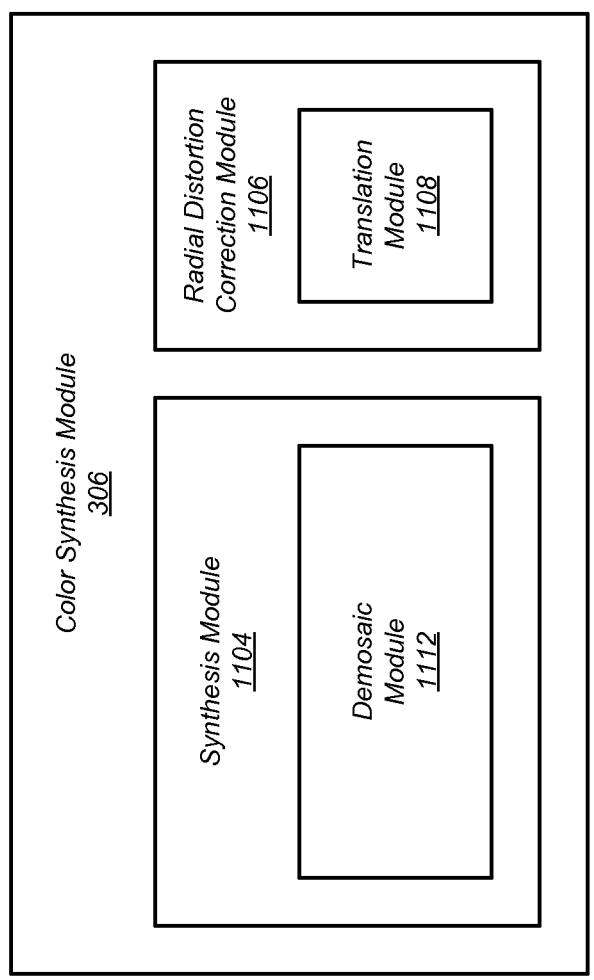
FIG. 11 shows detail of the color synthesis module of the camera of FIG. 3 according to an embodiment for radial distortion correction during demosaicing.

In the second approach to radial distortion correction during color synthesis, color-synthesized (RGB) pixels are generated along a distortion-corrected path. That is, radial distortion correction is performed during demosaicing. FIG. 11 shows detail of color synthesis module 306 of camera 300 of FIG. 3 according to an embodiment for radial distortion correction during demosaicing. Although in the described embodiments, the elements of color synthesis module 306 are presented in one arrangement, other arrangements are within the scope of the present invention. For example, various elements of color synthesis module 306 can be implemented in hardware, software, or combinations thereof.

Referring to FIG. 11, color synthesis module 306 includes a synthesis module 1104 and a radial distortion correction module 1106. Radial distortion correction module 1106 includes a translation module 1108. Synthesis module 1104 includes a demosaic module 1112. Color synthesis module 306 can be fabricated as one or more integrated circuits, which can include one or more other elements of camera 300.

Figure 12:
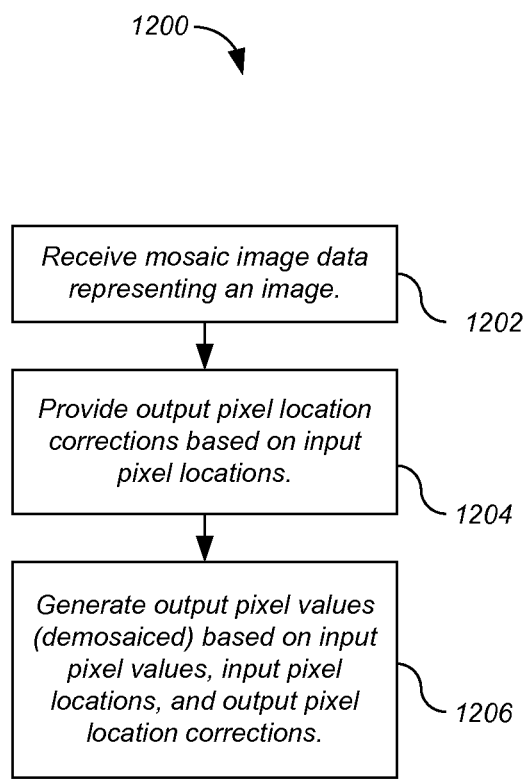
FIG. 12 shows a process for the color synthesis module of FIG. 11 according to one embodiment.

FIG. 12 shows a process 1200 for color synthesis module 306 of FIG. 11 according to one embodiment. Although in the described embodiments, the elements of process 1200 are presented in one arrangement, other arrangements are within the scope of the present invention. For example, in various embodiments, some or all of the steps of process 1200 can be executed in a different order, concurrently, and the like.

Referring to FIG. 12, input module 302 (FIG. 3) receives mosaic image data representing an image (step 1202). The image data includes radial distortion, which can be caused by lens 304 of camera 300 (FIG. 3). However, various embodiments are not limited by the cause of the radial distortion.

The image data represents a plurality of pixels each having a respective input pixel location. Translation module 1108 provides a respective output pixel location correction for each of the pixels based on the respective input pixel location (step 1204). The output pixel location corrections correct the output pixel locations for the radial distortion.

Synthesis module 1104 generates output pixel values based on the input pixel values, the input pixel locations, and the output pixel location corrections, where the input pixel values represent mosaic data and the output pixel values represent demosaiced data (step 1206).

Color-synthesis algorithms vary in nature, but a simple interpolation algorithm can generate a sample at each output pixel location as a function of the nearest input pixels. A simple linear interpolation approach is described. However, other approaches can be used, such as edge-adaptive interpolation schemes that take the gradient of the pixels into account, and the like.

For an output pixel 804 corresponding to a green input pixel 802, the red color value is given by equation (19) for a blue row, and by equation (20) for a red row.

$$R_{(i,j)} = \frac{R_{(i,j-1)} + R_{(i,j+1)}}{2} \qquad (19)$$

$$R_{(i,j)} = \frac{R_{(i-1,j)} + R_{(i+1,j)}}{2} \qquad (20)$$

The equation for the blue color value is complementary. For an output pixel 804 corresponding to a red or blue input pixel 802, the green color value for any row is given by equation (21).

$$G_{(i,j)} = \frac{G_{(i-1,j)} + G_{(i+1,j)} + G_{(i,j-1)} + G_{(i,j+1)}}{4} \qquad (21)$$

For an output pixel 804 corresponding to a blue input pixel 802, the red color value is given by equation (22).

$$R_{(i,j)} = \frac{R_{(i-1,j-1)} + R_{(i-1,j+1)} + R_{(i+1,j-1)} + R_{(i+1,j+1)}}{4} \qquad (22)$$

For an output pixel 804 corresponding to a red input pixel 802, the equation for the blue color value is complementary.

Figure 13:
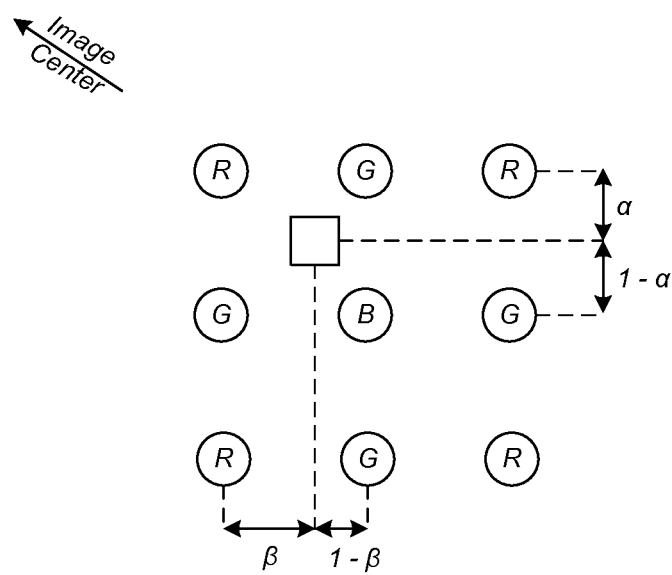
FIG. 13 shows a color-synthesis example for a blue sub-pixel location.

The above equations employ a 3×3 pixel region of support to generate a given triad of sub-pixels at any pixel location. FIG. 13 shows a color-synthesis example for a blue sub-pixel location. The operation is similar to that depicted in FIG. 7. However, the computation now involves a dual-pass operation. In the first pass, the missing red and green components at the distorted location of interest (blue pixel B in FIG. 13) are computed. The pixel value at the corresponding output (undistorted) pixel location (shown as a square) is then computed as a bilinear interpolation of the four pixels surrounding the region of support. Because pixels are synthesized in linear raster order, three pixels are already available in synthesized form. Hence, assuming that P(i,j) represent the synthesized pixels at each input pixel location, the output pixel value is given by:

$$P_{(i,j)}=(\beta *P_{(i-1,j)}+(1-\beta)*P_{(i-1,j-1)})*(1-\alpha)+(\beta *P_{(i,j)}+(1-\beta)*P_{(i,j-1)})*\alpha \qquad (23)$$

It should be noted that the described techniques for radial distortion correction during color synthesis are independent of the color synthesis algorithms or the exact distortion correction method.

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:

1. An apparatus, comprising:
    an input module configured to receive mosaic image data representing an image, wherein the mosaic image data includes radial distortion; and
    a color synthesis module, implemented in digital electronic circuitry, the color synthesis module including
        a radial distortion correction module configured to i) receive the mosaic image data, and ii) generate correction data to correct the radial distortion in the mosaic image data, and
        a synthesis module configured to i) receive the mosaic image data and the correction data, wherein the mosaic image data includes a plurality of input pixel values and respective input pixel locations prior to being corrected, and ii) generate demosaiced image data using (a) the mosaic image data and (b) the correction data.

2. The apparatus of claim 1, wherein:
    the correction data includes a plurality of output pixel location corrections, each output pixel location correction corresponding to one of the respective input pixel locations.

3. The apparatus of claim 2, wherein the demosaiced image data includes a plurality of output pixel values.

4. The apparatus of claim 3, wherein the synthesis module includes:
    a mosaic module configured to generate a plurality of intermediate pixel values based on i) the plurality of input pixel values, ii) the input pixel locations, and iii) the output pixel location corrections; and
    a demosaic module configured to demosaic the intermediate pixel values to generate the plurality of output pixel values.

5. The apparatus of claim 3, wherein:
    the synthesis module includes a demosaic module configured to generate the plurality of output pixel values based on i) the plurality of input pixel values, ii) the input pixel locations, and iii) the output pixel location corrections; wherein the input pixel values correspond to the mosaic image data, and wherein the output pixel values correspond to the demosaiced image data.

6. The apparatus of claim 1, wherein the mosaic image data corresponds to a Bayer mosaic.

7. The apparatus of claim 1, wherein the color synthesis module includes at least one integrated circuit configured to implement i) the radial distortion correction module and ii) the synthesis module.

8. The apparatus of claim 1, further comprising a camera, wherein the camera includes each of the input module and the color synthesis module.

9. A method, comprising:
    receiving mosaic image data representing an image, wherein the mosaic image data includes radial distortion; and
    using a camera to perform each of
        based on the mosaic image data, generating correction data to correct the radial distortion in the mosaic image data; and
        using both the mosaic image data and the correction data, generating demosaiced image data, wherein the mosaic image data includes a plurality of input pixel values and respective input pixel locations prior to being corrected.

10. The method of claim 9, wherein:
    the correction data includes a plurality of output pixel location corrections, each output pixel location correction corresponding to one of the respective input pixel locations.

11. The method of claim 10, wherein the demosaiced image data includes a plurality of output pixel values.

12. The method of claim 11, further comprising:
    generating a plurality of intermediate pixel values based on i) the plurality of input pixel values, ii) the input pixel locations, and iii) the output pixel location corrections; and
    demosaicing the intermediate pixel values to generate the plurality of output pixel values.

13. The method of claim 11, further comprising:
    generating the plurality of output pixel values based on i) the plurality of input pixel values, ii) the input pixel locations, and iii) the output pixel location corrections, wherein the input pixel values correspond to the mosaic image data, and the output pixel values correspond to the demosaiced image data.

14. The method of claim 9, wherein the mosaic image data corresponds to a Bayer mosaic.

15. The method of claim 9, further comprising:
based on the mosaic image data, using at least one integrated circuit to generate the correction data to correct the radial distortion in the mosaic image data; and
based on the mosaic image data and the correction data, using the at least one integrated circuit to generate the demosaiced image data.

* * * * *